(12) United States Patent
Sprengel

(10) Patent No.: US 11,524,545 B2
(45) Date of Patent: Dec. 13, 2022

(54) SWITCHING VALVE FOR AN AIR SPRING ARRANGEMENT AND AN AIR SPRING ARRANGEMENT

(71) Applicant: Dr. Ing. h.c. F. Porsche Aktiengesellschaft, Stuttgart (DE)

(72) Inventor: Thomas Sprengel, Stuttgart (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 382 days.

(21) Appl. No.: 16/930,374

(22) Filed: Jul. 16, 2020

(65) Prior Publication Data

US 2021/0016622 A1   Jan. 21, 2021

(30) Foreign Application Priority Data

Jul. 17, 2019   (DE) ...................... 10 2019 119 409.1

(51) Int. Cl.
*B60G 17/052*   (2006.01)
*B60G 11/27*   (2006.01)
(Continued)

(52) U.S. Cl.
CPC .......... *B60G 17/0523* (2013.01); *B60G 11/27* (2013.01); *B60G 17/048* (2013.01); *F16F 9/02* (2013.01); *F16F 9/34* (2013.01); *F16F 9/44* (2013.01); *F16K 3/0254* (2013.01); *F16K 3/14* (2013.01); *B60G 2202/152* (2013.01);
(Continued)

(58) Field of Classification Search
CPC .. B60G 17/0523; B60G 11/27; B60G 17/048; B60G 2202/152; B60G 2206/42; B60G 2500/2014; B60G 2800/162; B60G 2500/204; F16F 9/02; F16F 9/34; F16F 9/44; F16F 9/3242; F16F 2222/126;
(Continued)

(56) References Cited

U.S. PATENT DOCUMENTS 4,395,019 A * 7/1983 Searles ................... F16K 3/085
                                                                   137/329.01
5,402,821 A * 4/1995 Harstad ..................... F16K 3/32
                                                                         138/46
(Continued)

FOREIGN PATENT DOCUMENTS

DE        102012200388 A1     4/2013

*Primary Examiner* — James A English
*Assistant Examiner* — Daniel M. Keck
(74) *Attorney, Agent, or Firm* — RatnerPrestia

(57) ABSTRACT

A switching valve for an air spring arrangement of a motor vehicle, which switching valve has a valve housing arrangement which, in the installed state, is arranged between a first air volume and a second air volume. A valve closing member arrangement is actuatable by an actuator is provided such that the valve closing member arrangement, in a first position, fluidically connects the first air volume to the second air volume and, in a second position, fluidically separates the first air volume from the second air volume. The valve closing member arrangement is designed as a rotary slide arrangement. A rotary slide member with first openings is provided between two valve closing bodies, wherein, in the first position, the first openings correspond with second openings of the valve closing body such that a fluidic connection can be produced between the first and the second air volume.

9 Claims, 4 Drawing Sheets

Figure 1:
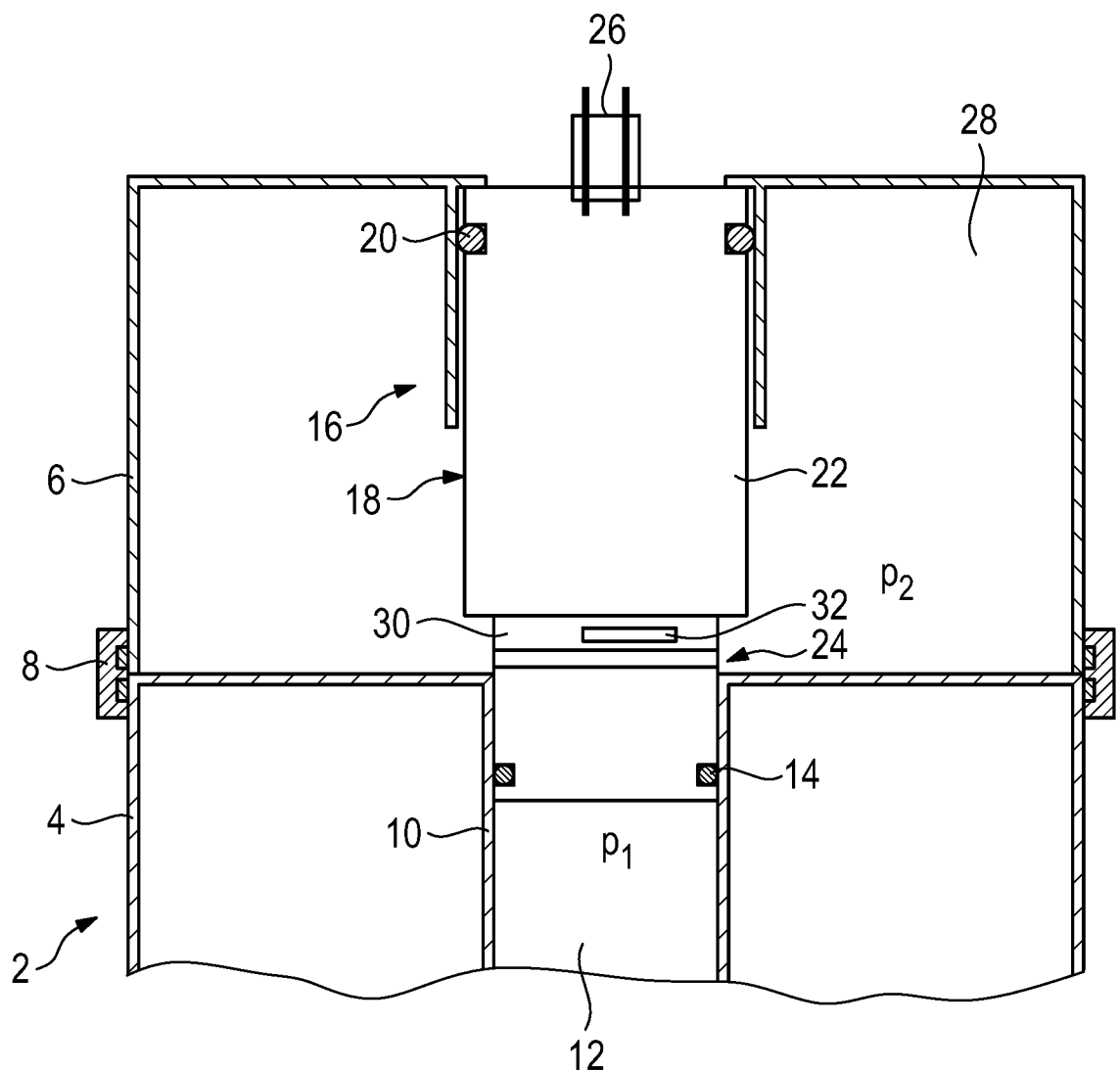

(51) Int. Cl.
*B60G 17/048* (2006.01)
*F16F 9/02* (2006.01)
*F16F 9/34* (2006.01)
*F16F 9/44* (2006.01)
*F16K 3/02* (2006.01)
*F16K 3/14* (2006.01)
*F16F 9/32* (2006.01)

(52) U.S. Cl.
CPC .. *B60G 2206/42* (2013.01); *B60G 2500/2014* (2013.01); *B60G 2800/162* (2013.01); *F16F 9/3242* (2013.01); *F16F 2222/126* (2013.01); *F16F 2228/066* (2013.01)

(58) Field of Classification Search
CPC .. F16F 2228/066; F16K 3/0254; F16K 3/085; F16K 3/14; F16K 31/041; F16K 47/00
See application file for complete search history.

(56) References Cited

U.S. PATENT DOCUMENTS

| | | | |
|---|---|---|---|
| 8,973,932 B2 | 3/2015 | Pielock | |
| 2006/0220283 A1* | 10/2006 | Leonard | F16F 9/0454 267/122 |
| 2017/0037976 A1* | 2/2017 | Tuineag | F16K 3/029 |
| 2017/0363169 A1* | 12/2017 | Bounds | F16F 9/34 |
| 2021/0172494 A1* | 6/2021 | Ehrich | F16F 9/04 |

\* cited by examiner

SWITCHING VALVE FOR AN AIR SPRING ARRANGEMENT AND AN AIR SPRING ARRANGEMENT

CROSS-REFERENCE TO RELATED APPLICATION

This application claims priority to German Patent Application No. 10 2019 119 409.1, filed Jul. 17, 2019, the content of such application being incorporated by reference herein in its entirety.

FIELD OF THE INVENTION

The invention relates to a switching valve for an air spring arrangement of a motor vehicle, which switching valve has a valve housing arrangement which, in the installed state, is arranged between a first air volume and a second air volume, wherein a valve closing member arrangement which is actuatable by means of an actuator is provided such that the valve closing member arrangement, in a first position, fluidically connects the first air volume the second air volume and, in a second position, fluidically separates the first air volume from the second air volume. The invention likewise relates to an air spring arrangement having an air spring housing which is designed such that a first air volume is connectable to or separable from a second air volume.

BACKGROUND OF THE INVENTION

A switching valve of said type and an air spring arrangement of said type are known from DE 10 2012 200 388 A1, which is incorporated by reference herein. Here, the air spring arrangement has a cover element in which a switching valve is arranged. Said switching valve is constructed as a classic electromagnetic valve, wherein a valve closing member of an actuator can separate two air volumes from one another and connect said two air volumes to one another. By means of a connection of the two air volumes, the entire air volume of the air spring arrangement is enlarged, whereby a spring characteristic of the air spring arrangement can be adapted to the requirements of the motor vehicle with regard to the loading state or the desired comfort characteristics. Here, to produce or to overcome a sealing function, high impulse forces must be generated by the actuator. By means of the cover element, the air spring arrangement is furthermore arranged on a body part of the motor vehicle. Furthermore, during the switching process of the switching valve, the problem arises that the switching movement of the armature causes an impulse which, in the case of the present air spring arrangement, transmits a disturbing noise into the body part of the motor vehicle.

SUMMARY OF THE INVENTION

The valve closing member arrangement disclosed herein is designed as a rotary slide arrangement, wherein a rotary slide member with first openings is provided between two valve closing bodies, wherein, in the first position, the first openings correspond with second openings of the valve closing body such that a fluidic connection can be produced between the first and the second air volume, wherein the rotary slide member and the two valve closing bodies have interacting sealing surfaces which are directed toward one another and which each have at least one helical run-on surface, which run-on surfaces are assigned to one another such that, in the first position of the rotary slide arrangement, the sealing surfaces have a spacing d to one another and, in the event of a rotation of the rotary slide member from the first into the second position, the respective helical run-on surfaces directed toward one another run on one another. It is hereby possible for the rotary slide member to be moved between the two positions with much lower impulse forces, which firstly permits the use of a smaller and thus more compact actuator and at the same time minimizes the disturbing switching noises. Furthermore, by means of the design according to aspects of the invention of the sealing surfaces, leakage and a switching delay during the change-over from one to the other position of the valve closing member arrangement can be minimized. Here, the rotary slide member basically has the major advantage that, in its closed position, without the application of a pressure difference between the first and the second air volume, it ensures a slow pressure equalization between the two air volumes. If the rotary slide member is in the closed position, and if a pressure difference prevails, the rotary slide member seals owing to its non-return function. In the case of use of the rotary slide member in an air spring arrangement, the spring movements of the air spring generate a pressure difference between the first and the second air volume, and the rotary slide member performs its sealing function.

To ensure a uniform symmetrical run-on behavior of the sealing surfaces, it is advantageous if the respective sealing surfaces have in each case two helical run-on surfaces which extend in each case over a rotational angle of 180°.

To ensure that, in the second position, self-locking of the sealing surfaces is avoided and the corresponding openings are distinctly separated from one another in the second position, the gradient of the helical run-on surfaces should amount to $\leq 10°$.

It is particularly advantageously the case that, in the first position of the rotary slide arrangement, a start line of the respective helical sealing surface of the rotary slide member is situated opposite an end line of the helical sealing surface of the respective valve closing body, such that an end surface of the respective helical run-on surface is formed as a stop surface for the first position of the rotary slide member.

The rotary slide member is advantageously designed to be movable in an axial direction by means of a driver member. In this way, it is possible for tolerances of the sealing surfaces with respect to one another to be compensated in a particularly simple manner.

In order to additionally optimize the sealing action, the sealing surfaces may have a sliding layer composed of abrasion-resistant material.

In one particularly advantageous embodiment, the actuator is designed as an electromagnetic drive and, here, in particular as a rotary magnetic drive. The rotary magnetic drive makes it possible to realize a particularly compact design of the switching valve. It is however also possible to use conventional electric motors.

The invention is likewise achieved by means of an air spring arrangement in which a switching valve according to aspects of the invention is arranged in uninstallable fashion in the air spring housing. Here, it is particularly advantageous if the switching valve is provided in a cover element for the air spring housing, wherein the first sealing member seals off the first air volume in a bottleneck-shaped housing part of the air spring housing.

BRIEF DESCRIPTION OF THE DRAWING FIGURES

Figure 2:
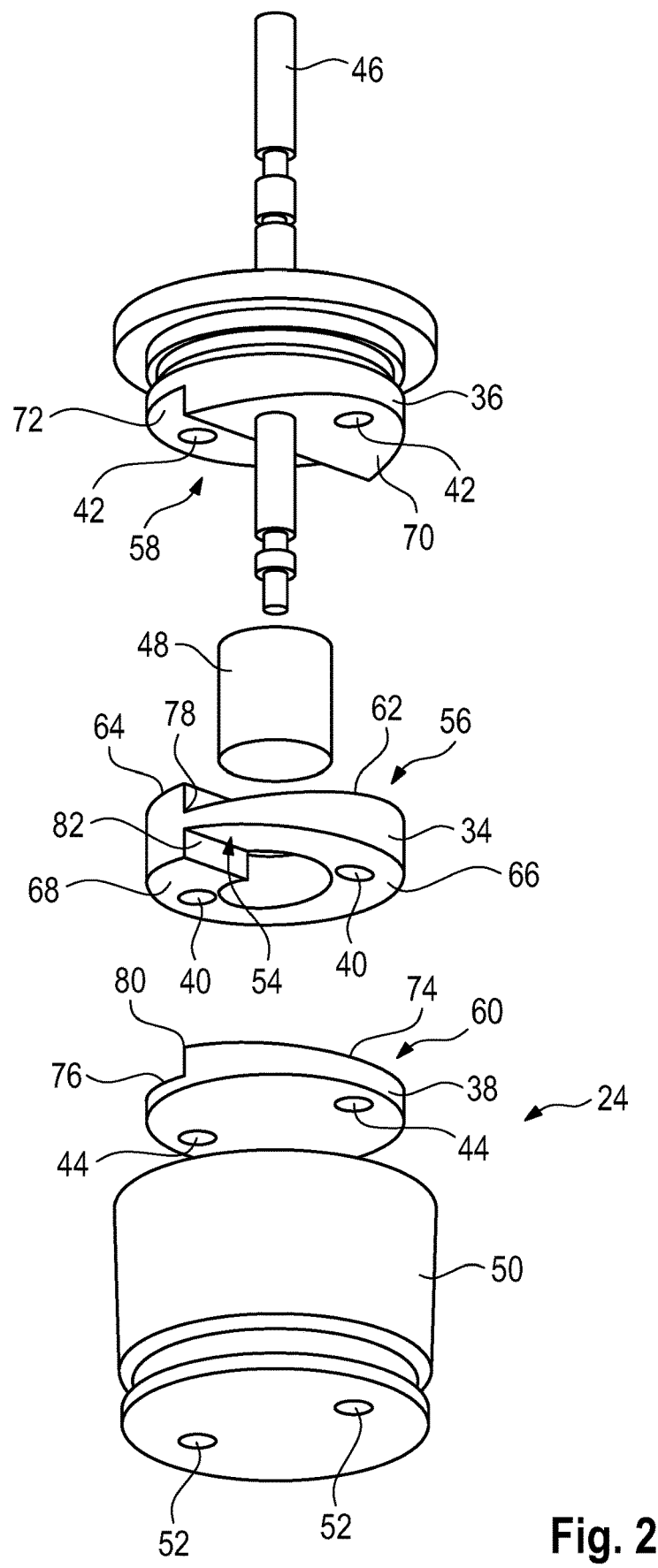
Figure 3A:
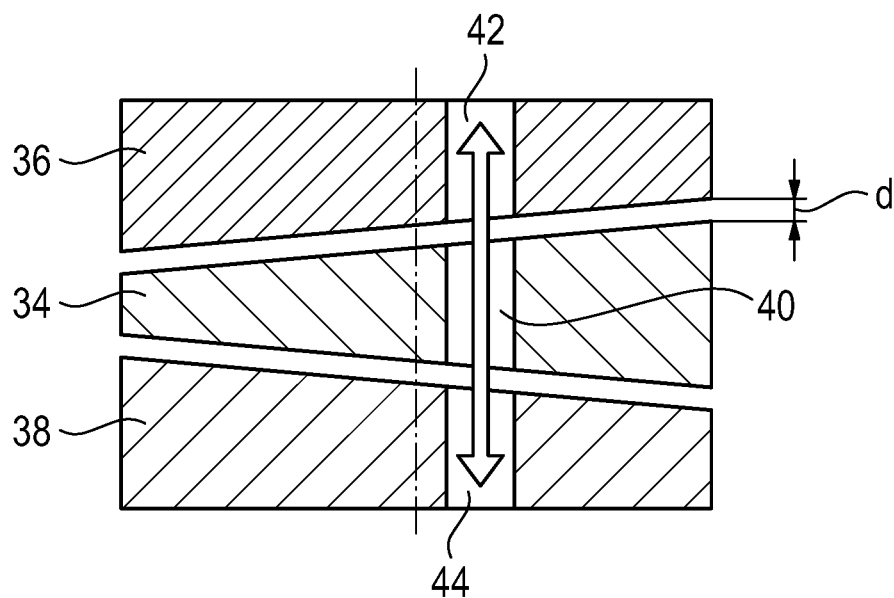
Figure 3B:
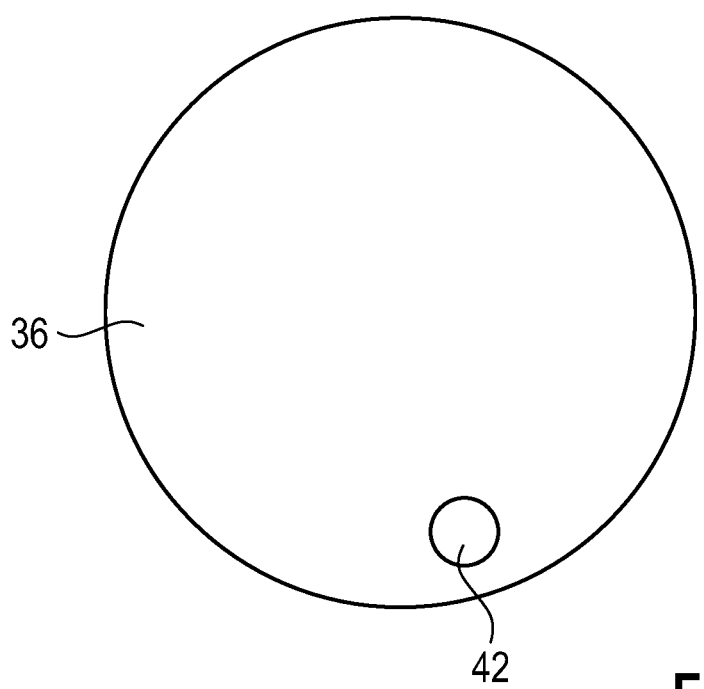
Figure 4A:
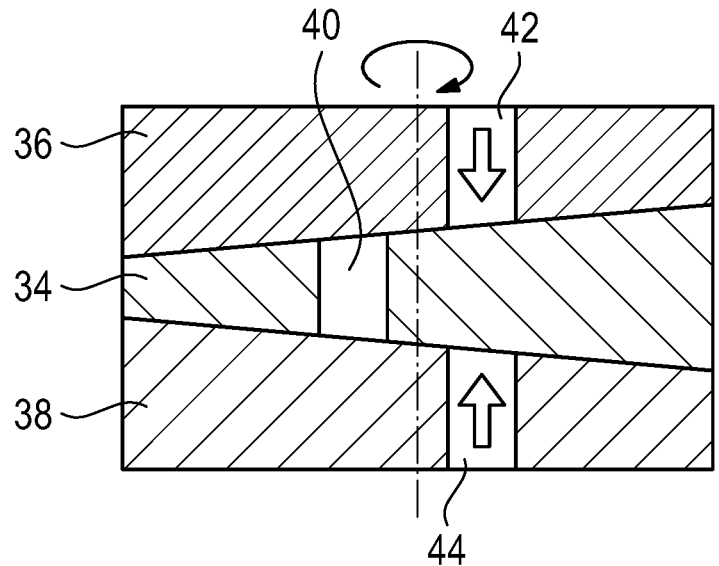
Figure 4B:
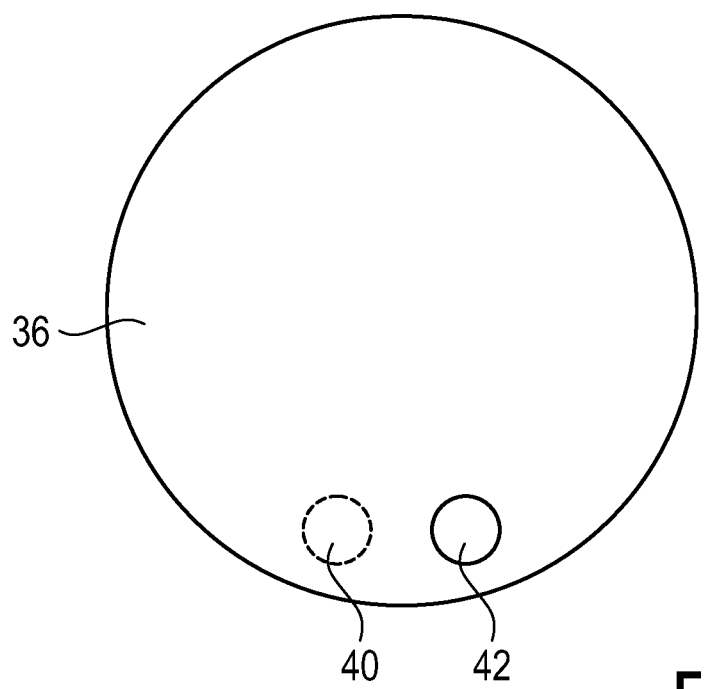

The invention will be explained in more detail on the basis of a drawing, in which:

FIG. 1 shows a sectional partial view of an air spring arrangement according to aspects of the invention with an inserted switching valve which is not illustrated in section, FIG. 2 shows a perspective exploded view of the switching valve according to aspects of the invention from FIG. 1, FIG. 3a shows a schematic sectional view with two valve closing bodies and with an interposed rotary slide member in a first position, and FIG. 3b shows a plan view of the upper valve closing body, FIG. 4a shows a schematic sectional view with the two valve closing bodies and with the interposed rotary slide member in a second position, and FIG. 4b shows a plan view of the upper valve closing body.

DETAILED DESCRIPTION OF THE INVENTION

FIG. 1 shows a sectional partial view of an air spring arrangement 2 according to aspects of the invention. The air spring arrangement 2 has an air spring housing 4 which is closed by means of a cover element 6. Here, the cover element 6 is connected in non-positively locking fashion to the air spring housing 4 in a known manner by means of a clamping ring arrangement 8. Here, the air spring housing 4 has a bottleneck-shaped housing part 10 in which there prevails a first air volume 12, which prevails in the entire air spring housing 4, with a pressure $p_1$. The bottleneck-shaped housing part 10 serves as an abutment part of a first seal arrangement 14 of a switching valve 16. The switching valve 16 has a valve housing 18 which, in the present case, is not illustrated in section and which, in a known manner, is illustrated in uninstallable fashion, and by means of a second seal arrangement 20, in the cover element 6 and thus in the air spring arrangement 2. In the valve housing 18, as an actuator 22, there is provided a rotary magnetic drive (not illustrated in any more detail) which is coupled in a known manner to a valve closing arrangement designed as a rotary slide arrangement 24. The switching valve 16 has an electrical plug arrangement 26 in order to be connected in a known manner to a control unit (not illustrated in any more detail) of the motor vehicle.

The rotary slide arrangement 24 of the switching valve 16 separates the first air volume 12 from a second air volume 28 with a pressure $p_2$ or connects the first air volume 12 to the second air volume 28. In the case of a fluidic connection of the two air volumes 12, 28, the entire air volume 12, 28 is enlarged in relation to the first air volume 12, which leads to an adaptation of the spring characteristic of the air spring arrangement 2 to the loading state and/or to setting demands of a driver. In this illustration, the reference designation 30 denotes a connection piece of the valve housing arrangement 18 between the rotary slide arrangement 24 and the actuator 20, which connection piece has cutouts 32 in order to ensure fluidic communication.

FIG. 2 shows a perspective exploded view of the switching valve 16 according to aspects of the invention. The rotary slide arrangement 24 has a rotary slide member 34 which is arranged between two valve closing bodies 36, 38, specifically a first valve closing body 36 and a second valve closing body 38. The rotary slide member 34 has, in a known manner, first openings 40 which correspond with second openings 42, 44 in the valve closing bodies 36, 38 such that a fluidic connection can be produced, in combination with the cutouts 32, between the first and the second air volume 12, 26. For this purpose, the rotary slide member 34 can be driven in rotation, via a rotary shaft 46 of the rotary magnetic drive which is not illustrated in any more detail, by means of a driver member 48. Here, the rotary slide member 34 is mounted axially movably on the driver member 48 in order to be able to compensate tolerances.

In order to be able to design the rotary slide arrangement 24 to be as compact as possible and as a preassembled part, the valve closing body 36 is formed as a cover part which interacts in a sealed manner with a housing part 50 in which the second valve closing body 38 is rotationally fixedly mounted. In order to be able to fluidically communicate with the air volume 12, the housing part 50 has housing part openings 52 which, for this purpose, are provided so as to overlap the openings 44.

In order that, as discussed in more detail in particular in conjunction with FIGS. 3a, 3b and 4a, 4b, the switching valve 16 can switch in the simplest and quietest manner possible in the presence of a pressure difference between the pressures $p_1$, $p_2$ in the volumes 12, 28, the rotary slide member 34 and the valve closing body 36, 38 have sealing surfaces 54, 56, 58, 60 which are directed toward one another and which have in each case two helical run-on surfaces 62, 64; 66, 68; 70, 72; 74, 76. Here, the helical run-on surfaces 62, 64; 66, 68; 70, 72; 74, 76 are arranged such that, in the first position of the rotary slide arrangement 24, the sealing surfaces 54, 56, 58, 60 have a spacing d to one another and, in the event of a rotation of the rotary slide member 34 from the first into the second position, the respective run-on surfaces 62, 64, 66, 68, 70, 72, 74, 76 which are directed toward one another run on one another. The first position of the rotary slide arrangement 24 is illustrated here in FIGS. 3a and 3b, wherein the openings 40, 42, 44 overlap and permit an exchange of fluid. FIGS. 4a and 4b illustrate the second position of the rotary slide arrangement 24, in which the sealing surfaces 54, 56 with the run-on surfaces 62, 64, 66, 68 of the rotary slide member 34 have come into contact with the respective run-on surfaces 70, 72, 74, 76 of the sealing surfaces 58, 60 of the valve closing body 36, 38 and the openings 40 have been rotated such that an interruption of the exchange of fluid between the two air volumes 12, 28 is ensured.

As is clearly shown in FIG. 2, the respective sealing surfaces 54, 56, 58, 60 have in each case two helical run-on surfaces 62, 64, 66, 68, 70, 72, 74, 76 which extend in each case over an angle of rotation of 180°. Here, the gradient of the respective run-on surfaces 62, 64, 66, 68, 70, 72, 74, 76 amounts to approximately 8°. Here, in the first position of the rotary slide arrangement 24, a start line 78 of the respective helical run-on surface 62, 64, 66, 68 of the rotary slide member 34 is situated opposite an end line 80 of the helical run-on surface 70, 72, 74, 76 of the respective valve closing body 36, 38, such that an end surface 82 of the respective helical run-on surfaces 62, 64, 66, 68, 70, 72, 74, 76 is formed as a stop surface for the first position of the rotary slide member 34. In order to assist the sealing action of the sealing surfaces 54, 56, 58, 60 and prevent self-locking of the sealing surfaces 54, 56, 58, 60, the sealing surfaces 54, 56, 58, 60 have a sliding layer composed of abrasion-resistant material.

What is claimed:

1. A switching valve for an air spring arrangement of a motor vehicle, the switching valve comprising:
   a valve housing arrangement which, in an installed state, is arranged between a first air volume and a second air volume,
   a valve closing member arrangement which is actuatable by way of an actuator, between a first position that fluidically connects the first air volume to the second air volume and, a second position that fluidically separates the first air volume from the second air volume, wherein the valve closing member arrangement is a rotary slide arrangement comprising two valve closing bodies and a rotary slide member with first openings and disposed between the two valve closing bodies, wherein, in the first position, the first openings register with second openings of the valve closing bodies such that a fluidic connection is produced between the first and the second air volume, wherein the rotary slide member and the two valve closing bodies have interacting sealing surfaces which are directed toward one another and which each have at least one helical run-on surface, which run-on surfaces are assigned to one another such that, in the first position of the rotary slide arrangement, the sealing surfaces have a spacing (d) with respect to one another, and, in the event of a rotation of the rotary slide member from the first position into the second position, the respective helical run-on surfaces directed toward one another run on one another.

2. The switching valve as claimed in claim 1, wherein the respective sealing surfaces each have two helical run-on surfaces which extend over an angle of rotation of about 180°.

3. The switching valve as claimed in claim 1, wherein a gradient of the helical run-on surfaces amounts to ≤10°.

4. The switching valve as claimed in claim 1, wherein in the first position of the rotary slide arrangement, a start line of the respective helical sealing surface of the rotary slide member is situated opposite an end line of the helical sealing surface of the respective valve closing body, such that an end surface of the respective helical run-on surfaces is formed as a stop surface for the first position of the rotary slide member.

5. The switching valve as claimed in claim 1, wherein the rotary slide member is mounted so as to be movable in an axial direction by a driver member.

6. The switching valve as claimed in claim 1, wherein the sealing surfaces have a sliding layer composed of abrasion-resistant material.

7. The switching valve as claimed in claim 1, wherein the actuator is a rotary magnetic drive.

8. An air spring arrangement having an air spring housing which is configured such that a first air volume ($p_1$) is either connectable to or separable from a second air volume ($p_2$), wherein the switching valve, as claimed in claim 1, is arranged in uninstallable fashion in the air spring housing.

9. The air spring arrangement as claimed in claim 8, wherein the switching valve is disposed in a cover element for the air spring housing, wherein a first seal member seals off the first air volume ($p_1$) in a bottleneck-shaped housing part of the air spring housing.

* * * * *